US012155680B2

(12) United States Patent
Pastore et al.

(10) Patent No.: US 12,155,680 B2
(45) Date of Patent: Nov. 26, 2024

(54) METHODS OF MONITORING AND PROTECTING ACCESS TO ONLINE SERVICES

(71) Applicant: Cleafy Società per Azioni, Milan (IT)

(72) Inventors: Nicolò Pastore, Pero (IT); Carmine Giangregorio, Milan (IT)

(73) Assignee: CLEAFY SOCIETÀ PER AZIONI, Milan (IT)

( * ) Notice: Subject to any disclaimer, the term of this patent is extended or adjusted under 35 U.S.C. 154(b) by 191 days.

(21) Appl. No.: 17/696,721

(22) Filed: Mar. 16, 2022

(65) Prior Publication Data

US 2022/0303293 A1 Sep. 22, 2022

(30) Foreign Application Priority Data

Mar. 17, 2021 (IT) .................... 102021000006383

(51) Int. Cl.
*H04L 9/40* (2022.01)
(52) U.S. Cl.
CPC ...... *H04L 63/1425* (2013.01); *H04L 63/1475* (2013.01)
(58) Field of Classification Search
CPC ............. H04L 63/1433; H04L 63/1416; H04L 63/1425; H04L 2463/082; H04L 2463/146;
(Continued)

(56) References Cited

U.S. PATENT DOCUMENTS 9,838,384 B1* 12/2017 Kane-Parry ........... G06F 21/316
10,275,613 B1 4/2019 Olenoski et al.
(Continued)

FOREIGN PATENT DOCUMENTS

EP 3021550 A1 5/2016
EP 3021551 A1 5/2016
(Continued)

OTHER PUBLICATIONS

Italian Search Report and Written Opinion in corresponding Italian Application No. 102021000006383 mailed on Dec. 9, 2021, 14 pages.
Office Action mailed Jan. 19, 2023, in U.S. Appl. No. 17/211,323.
Office Action mailed May 1, 2023, in U.S. Appl. No. 17/211,577.
InnovationQ Plus—IP.com (2023).
(Continued)

*Primary Examiner* — Sargon N Nano
(74) *Attorney, Agent, or Firm* — MH2 TECHNOLOGY LAW GROUP LLP

(57) ABSTRACT

A method of monitoring and protecting access to an online service from Account Take Over may include: providing a Traffic Inspector in communication with a client device and web server; providing a Traffic Analyzer in communication with the Inspector; identifying each browsing session of the client device; extracting and identifying one or more usernames when a user performs authentication to the online service by analyzing traffic exchanged between the client device and web server; collecting first data concerning unique and/or non-unique technical parameters and associating the first data with respective identified one or more usernames and with the client device; collecting second data concerning unique and/or non-unique technical parameters and associating the second data with an anonymous application browsing session or web beacon; and taking security measures when a number of identified usernames associated with the anonymous application browsing session or web beacon exceeds a predetermined threshold value.

20 Claims, 4 Drawing Sheets

(58) Field of Classification Search
CPC . H04L 63/1483; H04L 63/1475; H04L 41/28; H04L 63/00; H04L 29/06; H04L 9/40; G06F 21/31; G06F 21/577; G06F 21/6263; G06F 21/552; G06F 21/57; G06F 21/55; G06F 21/62

See application file for complete search history.

(56) References Cited

U.S. PATENT DOCUMENTS

| | | | |
|---|---|---|---|
| 10,346,856 | B1 | 7/2019 | Kohli et al. |
| 10,496,263 | B2 | 12/2019 | So et al. |
| 11,140,158 | B1* | 10/2021 | Adam ................... H04L 63/102 |
| 11,444,962 | B2* | 9/2022 | Crume ................ H04L 63/1416 |
| 11,973,798 | B2 | 4/2024 | Pastore et al. |
| 2002/0046170 | A1 | 4/2002 | Gvily |
| 2004/0059931 | A1 | 3/2004 | Fulkerson, Jr. et al. |
| 2008/0244076 | A1 | 10/2008 | Shah et al. |
| 2008/0255944 | A1 | 10/2008 | Shah et al. |
| 2008/0263197 | A1 | 10/2008 | Stephens |
| 2009/0089869 | A1 | 4/2009 | Varghese |
| 2009/0168995 | A1 | 7/2009 | Banga et al. |
| 2009/0327141 | A1* | 12/2009 | Rabin ................. G06Q 30/0603 708/250 |
| 2010/0180775 | A1 | 7/2010 | Kollep et al. |
| 2011/0022704 | A1 | 1/2011 | Duan et al. |
| 2012/0291129 | A1* | 11/2012 | Shulman ............... H04L 63/145 726/23 |
| 2013/0055339 | A1 | 2/2013 | Apostolescu et al. |
| 2013/0132508 | A1 | 5/2013 | Lucash |
| 2013/0179982 | A1 | 7/2013 | Bridges et al. |
| 2013/0183949 | A1* | 7/2013 | Sulmar ................. H04L 61/103 455/415 |
| 2014/0075014 | A1 | 3/2014 | Chourey |
| 2014/0298469 | A1 | 10/2014 | Marion et al. |
| 2014/0337513 | A1 | 11/2014 | Amalapurapu et al. |
| 2015/0326595 | A1 | 11/2015 | Liu et al. |
| 2015/0350243 | A1* | 12/2015 | Call .................... H04L 67/1001 726/23 |
| 2016/0034468 | A1 | 2/2016 | Hart et al. |
| 2016/0057628 | A1 | 2/2016 | Sewall et al. |
| 2016/0248788 | A1 | 8/2016 | Saito et al. |
| 2017/0063885 | A1* | 3/2017 | Wardman ............ H04L 63/1416 |
| 2017/0063889 | A1* | 3/2017 | Muddu ................ H04L 43/045 |
| 2017/0289173 | A1 | 10/2017 | Resch et al. |
| 2018/0033089 | A1* | 2/2018 | Goldman .............. H04L 63/102 |
| 2018/0152471 | A1* | 5/2018 | Jakobsson ........... H04L 63/1425 |
| 2018/0212993 | A1* | 7/2018 | Call ...................... G06F 21/566 |
| 2018/0217850 | A1 | 8/2018 | Kolesnikov et al. |
| 2018/0309721 | A1* | 10/2018 | Ashley .................... H04L 63/06 |
| 2018/0316665 | A1 | 11/2018 | Caldera et al. |
| 2019/0058719 | A1 | 2/2019 | Kar et al. |
| 2019/0182214 | A1 | 6/2019 | Liu et al. |
| 2019/0349351 | A1* | 11/2019 | Verma .................... H04L 63/30 |
| 2020/0137105 | A1* | 4/2020 | Endler ................ G06F 21/6218 |
| 2020/0137580 | A1* | 4/2020 | Yang ........................ H04W 4/46 |
| 2020/0153836 | A1 | 5/2020 | Johnson et al. |
| 2020/0177623 | A1* | 6/2020 | Call ..................... H04L 63/1441 |
| 2021/0021637 | A1 | 1/2021 | Srivastava |
| 2021/0029137 | A1 | 1/2021 | Wright et al. |
| 2021/0243207 | A1 | 8/2021 | Crume |
| 2021/0258318 | A1* | 8/2021 | Greene ................... G06F 21/31 |
| 2021/0306355 | A1 | 9/2021 | Pastore et al. |
| 2021/0306369 | A1 | 9/2021 | Pastore et al. |
| 2021/0306376 | A1 | 9/2021 | Pastore et al. |
| 2021/0329451 | A1 | 10/2021 | Jun et al. |
| 2023/0034910 | A1 | 2/2023 | Engelberg et al. |

FOREIGN PATENT DOCUMENTS

| | | |
|---|---|---|
| EP | 3885945 B1 | 11/2023 |
| EP | 4068125 B1 | 1/2024 |
| WO | 2012/166669 A2 | 12/2012 |

OTHER PUBLICATIONS

Extended European Search Report mailed Sep. 5, 2022, corresponding to U.S. Appl. No. 17/696,721.

Office Action mailed Jun. 23, 2023, in U.S. Appl. No. 17/211,646.

Final Office Action mailed Aug. 2, 2023, in U.S. Appl. No. 17/211,323.

Final Office Action mailed Nov. 21, 2023, in U.S. Appl. No. 17/211,577.

Final Office Action mailed Jan. 31, 2024, in U.S. Appl. No. 17/211,646.

* cited by examiner

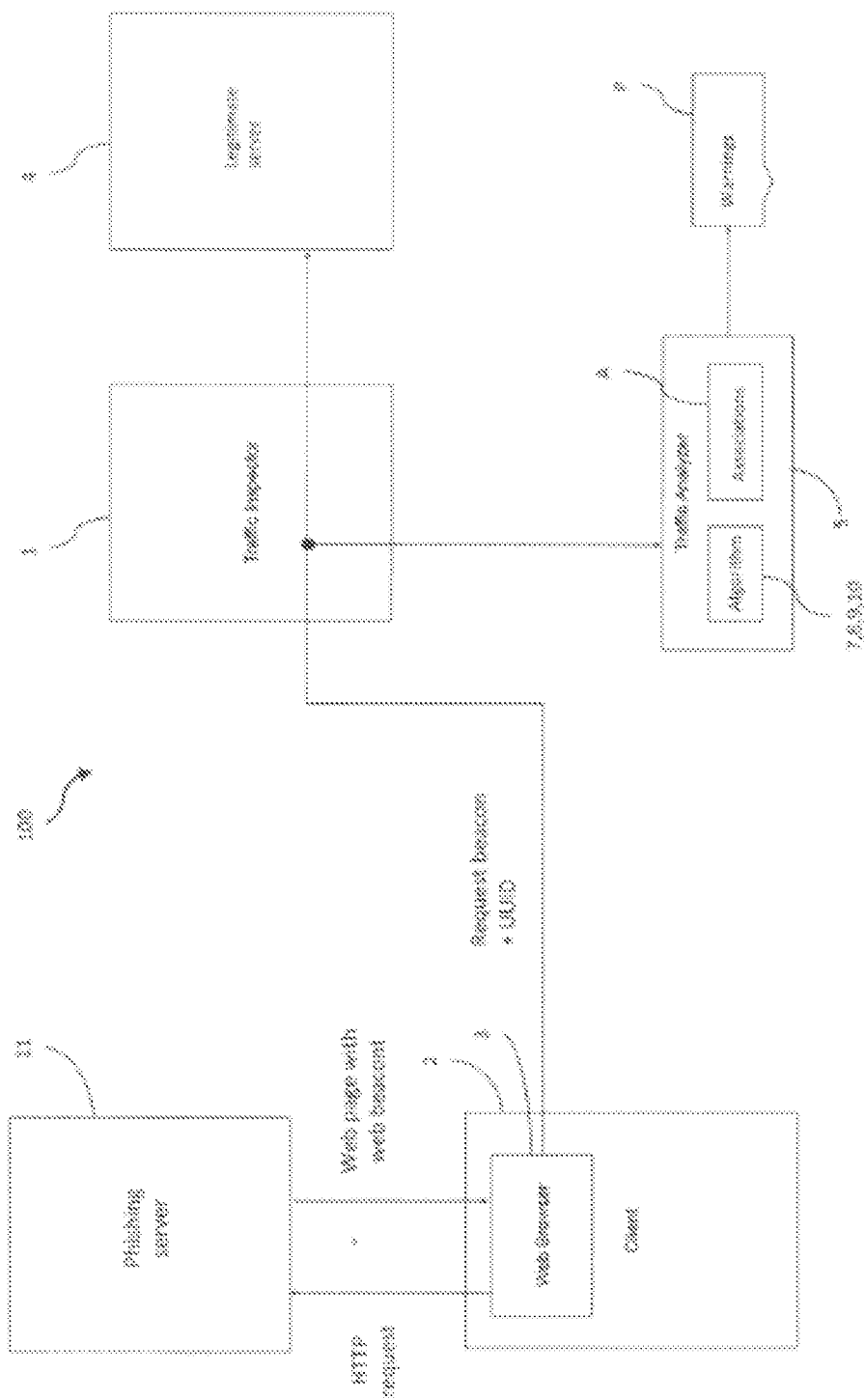

METHODS OF MONITORING AND PROTECTING ACCESS TO ONLINE SERVICES

CROSS-REFERENCE TO RELATED APPLICATION(S)

This application claims priority under 35 U.S.C. § 119 from Italian Patent Application No. 102021000006383, filed on Mar. 17, 2021, in the Italian Patent and Trademark Office ("IPTO"), the entire contents of which are incorporated herein by reference.

FIELD OF THE INVENTION

The present disclosure relates to a method of monitoring and protecting access to an online service from Account Take Over ("ATO"). Namely, the present invention relates to a method of monitoring and protecting access to a web or mobile application.

The present disclosure relates to a method of monitoring and protecting access to an online service from Account Take Over as a method of monitoring and protecting access to a web or mobile application against cyber-attacks following theft of user credentials, also known as Account Take Over, ATO.

DISCUSSION OF THE RELATED ART

Cyber-attacks known as Man-in-the-Browser, Man-in-the-Middle, and Bot Attack may be used to steal sensitive data from the user, such as online banking log-in credentials. In these circumstances, the malware prevents the user from logging in to the online banking site. This is because the credentials that the user enters to normally log in to the online banking platform are provided to the malware that simulated the login interface and entertains the user by recreating an emulation of the online banking web page. Once the data has been stolen from the user, the malware may send the collected credentials to a fraudster. Parallel to the open session in which the user operates without being authenticated, the fraudster opens a new page and enters the user credentials to authenticate. Once authenticated, the fraudster may freely operate on the account of the unaware user, and start fraudulent transactions. This technique is defined in the art as Account Take Over ("ATO"), as the fraudster takes over the account and acts instead of the user with no hindrance. Furthermore, the attack might be continued if the fraudster were able to further use the malware-infected open session to obtain additional sensitive data from the user, such as higher-level login credentials required for large-volume money transactions.

It should be also noted that a fraudster might launch an Account Take Over attack without using malware. Such type of attack might use techniques known as phishing. For example, the fraudster might cause a user to browse a site identical to the authenticated online service. One technique might consist in sending an e-mail whose graphics is similar to the graphics of an official entity containing a link to the malicious phishing site. The unaware user might not distinguish the legitimate site from the malicious site and enter his/her credentials in the latter. The malicious site is controlled by the fraudster, whereby the credentials are recorded or directly sent to the fraudster. Then, the fraudster may use the collected credentials to authenticate to the online service and freely conduct transactions therein.

Furthermore, other techniques are known, similar to the classical web-based phishing, which allow a fraudster to steal credentials from a user, such as Smishing, Vishing, Spoofing, and Subscriber Identity Module ("SIM") swap.

PRIOR ART PROBLEM

Prior art systems can detect and possibly inhibit the action of malware. For example, EP 3 021 550 A1 and EP 3 021 551 A1 disclose a malware detection method and a malware protection method.

Nevertheless, in the above-discussed cases, there is no way to know the identity of the user who was unaware of being attacked by the malware and was not authenticated. If there is malware in a session that has not been authenticated yet, the prior art can identify the presence of the malware but there is no way to know the user to whom the infected session belongs. As a result, the malware can easily recover sensitive session data and forward it to a fraudster, who will open a new session by logging in with the stolen data. The new session will be thus recognized as valid, because it was authenticated. As mentioned above, the new session is opened using data stolen from the user with the so-called Account Take Over technique.

Therefore, when the fraudster opens a new session of the online banking platform and regularly logs in, they have the right credentials of the unaware user and nothing can be done to prevent such fraudulent conduct against the user.

Furthermore, the techniques used to identify phishing attacks are not able to associate the user involved in the identified phishing attack.

It should be noted that, once the fraudster has stolen credentials from a user (e.g., by Phishing, Smishing, Vishing, Spoofing, or SIM swap), they log in to the online service using one device or a limited set of devices in their possession. Prior art methods cannot identify the fraudster when they log in using all the credentials of the legitimate user. In addition, the fraudster tends to repeat this operation with different users, thereby launching a number of attacks and hence multiple frauds.

A few examples of illegitimate logins using multiple accounts on a single device are listed below:
  a single user logs in with a large number of user profiles (e.g., 100 user profiles) from the same device:
    i) this may be the case of a fraudster who collected credentials by phishing and uses them in Account Take Over attack scenarios,
    ii) a fraudster who uses data from a data breach; and
    iii) a fraudster who manages bank accounts of a large number of figureheads (e.g., money mules) to transfer proceeds of fraud;
  a single user creates a large number of accounts from the same device; for example, this may be the case of a user who illicitly collected personal data and conducts farming of users using such personal data;
  virtual users (e.g., BOTs) automatically log in to a large number of user profiles from the same device or from a small number of devices (e.g., Botnets operating on artificially generated user profiles);
  a single user uses a large number of illicitly collected credit cards on the same Automated Teller Machine ("ATM") for the purpose of withdrawing large amounts of money (e.g., cash out following theft of credit card numbers); and
  multiple users log in with their credentials from the same shared device (eVoting platform).

Finally, it should be noted that there are also legitimate log in situations with multiple accounts from the same device, examples whereof are as follows:
- a single user with a personal device (e.g., personal computer ("PC"), smartphone) logs in with his personal user profile to the personal bank account and to the corporate bank account;
- a family with five people and five personal accounts, logging in from the same common device (e.g., family PC);
- multiple workers with personal accounts log in to a shared corporate device (e.g. corporate computer); and
- multiple different users logging in with their personal user profiles to web services through a common device in a room, such as an Internet Cafe.

Therefore, the need is felt to be able to identify and distinguish situations of legitimate use of multiple accounts on a single device from situations of illegitimate use.

SUMMARY OF THE INVENTION

The object of the present invention is to provide a method of monitoring and protecting access to an online service that can obviate the drawbacks of the prior art.

A further object of the present invention is to provide a method of monitoring and protecting access to an online service, such as a web or mobile application, that can protect the user from Account Take Over attacks.

A further object of the present invention is to provide a method of monitoring and protecting access to an online service that can detect multiple account logins, or attempted logins, from a single device or from a small group of devices, in an abnormal number with respect to a preset threshold.

Benefits of the Invention

One embodiment provides a method that affords monitoring and protection of access to an online service, such as a web or mobile application, from Account Take Over attacks, and thereby reduces fraud risk to users.

A further embodiment provides a method that affords recognition of multiple fraudulent accesses from a single device, or from a small number of devices, namely during an anonymous browsing session of the malware-attacked web or mobile application, to thereby be able to protect authenticated browsing sessions that are initiated formally by multiple users, but potentially by a fraudster who has stolen credentials from the user.

Yet another embodiment provides a method that affords recognition of: logins via affected user profiles (e.g., data breach); logins via illicitly collected user profiles (e.g., phishing); logins via maliciously collected user profiles (e.g., social engineering); attempted logins with multiple user profiles (e.g., brute forcing for password cracking); logins via lent or abnormal user profiles (e.g., accounts provided by figureheads); creation of user profiles with unauthorized personal data (e.g., farming of unaware users, or requests for loans following identity theft).

Therefore, the method hereof affords identification of different aspects concerning the use of a user profile, such as: access to a system via such user profile (eg., application login); attempted access to a system (e.g., application login, brute forcing); creation of user profiles for access to a system (e.g., farming of users, identity theft); transactions on a system through the use of user profiles whose operation is not authorized (e.g., management of bank accounts of money mules), automatic use of virtual user profiles (e.g., Botnets that manage a large number of user profiles for generating illicit traffic or unauthorized automatic transactions).

BRIEF DESCRIPTION OF THE DRAWINGS

The characteristics and advantages of the present disclosure will appear from the following detailed description of a possible practical embodiment, illustrated as a non-limiting example in the set of drawings, in which:

FIG. 4 shows a system 100 in which the method of the present invention may be implemented.

DETAILED DESCRIPTION

Even when not expressly stated, the individual features as described with reference to the particular embodiments shall be intended as auxiliary to and/or interchangeable with other features described with reference to other exemplary embodiments.

The present invention relates to a method of monitoring and protecting access to an online service from Account Take Over. Namely, the present invention relates to a method of monitoring and protecting a user account from an attack by a fraudster F, for example using malware M, aimed at stealing user credentials for access to the online service.

Specifically, the method of the present invention has the purpose of detecting a fraudster F logging in to the online service via a client device 2, or a small group of devices. The fraudster F logs in to the online service, by authenticating from time to time, using a plurality of different user profiles whose credentials have been illegally stolen from legitimate users, for example, through Phishing, Smishing, Vishing, Spoofing, and/or SIM swap.

As used herein, an online service is defined as a web and mobile service or application that requires credentials to be used by a user in a secure manner. A popular online service consists of web- or mobile-based online banking platforms, which allow registered and authenticated users to perform online financial operations, such as financial transactions. This is specifically the case of a Home Banking service through which a user is able to transfer funds after authenticating with credentials, e.g. a username and password and, optionally, a temporary token.

Figure 1:
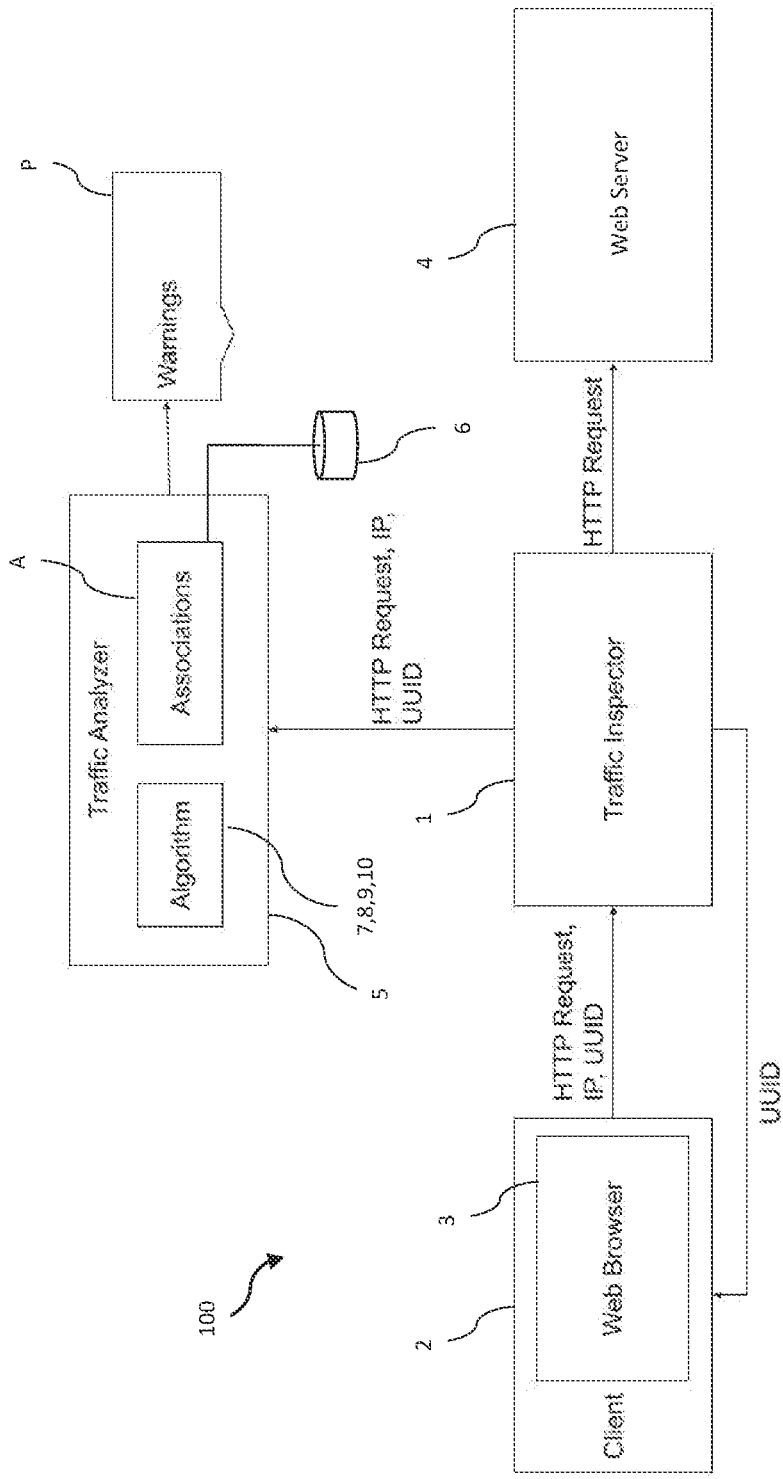
FIGS. 1 and 2 show a system 100 in which the method of the present invention may be implemented.
Figure 2:
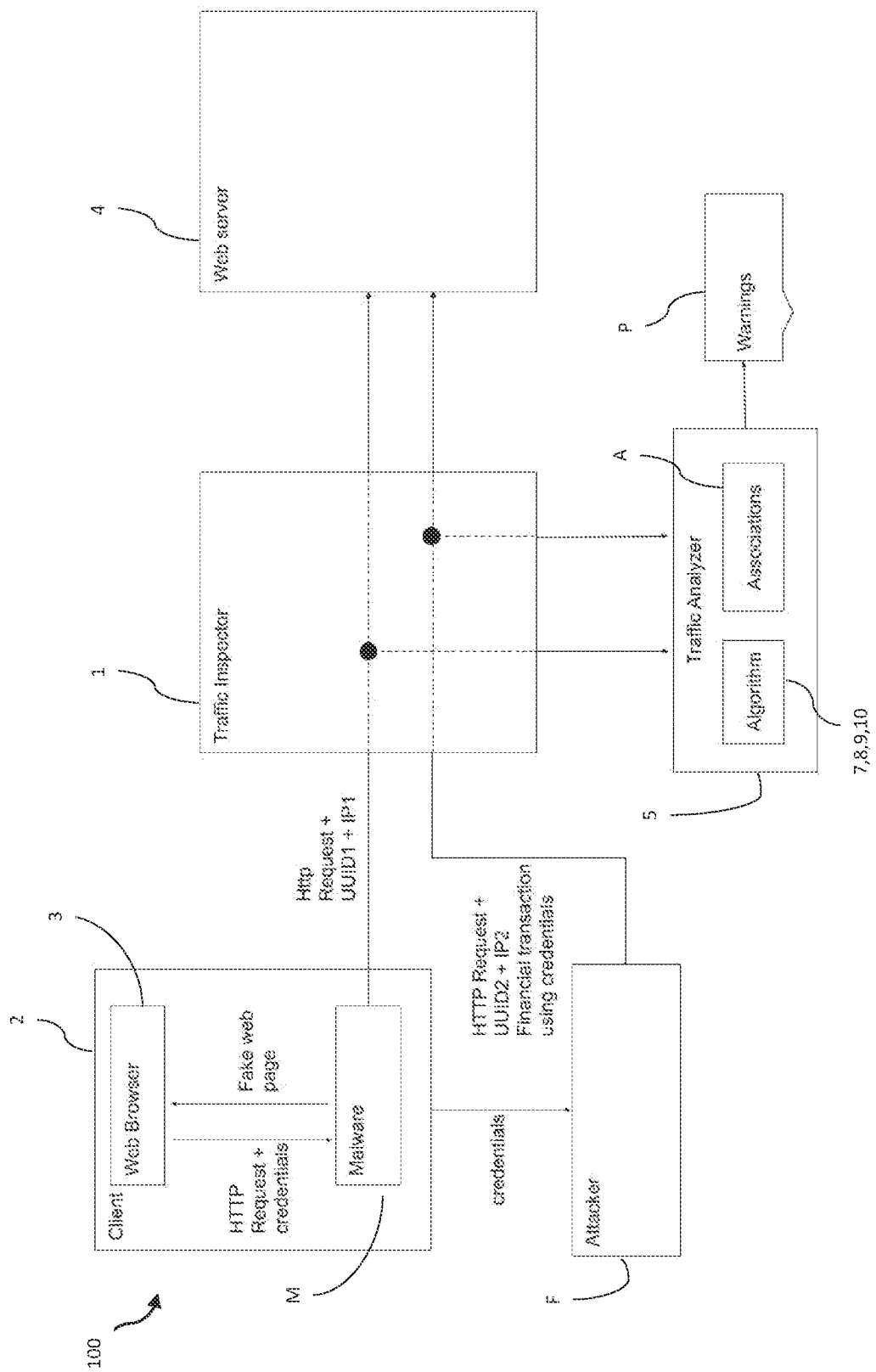

In the accompanying FIGS. 1, 2, and 4, numeral 100 designates a system in which the method of the present invention may be implemented. In other words, reference is made to the system 100 as a network environment, which apparently consists of hardware-based network devices and components for Internet browsing, such as servers, databases, and processing units, in which the first embodiment of the method of the present invention may be implemented.

The method of monitoring and protecting access to an online service from Account Take Over comprises the step of providing a Traffic Inspector 1 in signal communication with at least one client device 2 for Internet browsing and with a web server 4 having an online service residing therein.

As used herein, a client device 2 refers to an Internet browsing device in signal communication with the web server 4. The client device 2 is able to send requests to the web server 4 and to receive responses through an Internet network. The client device 2 may be a tablet, a laptop, a desktop computer, a smart television ("TV"), a smartwatch, a smartphone, or any other device with the ability of processing, communicating with a web server 4, and displaying contents obtained from the web server 4 or contents already present inside the client device 2. Such contents might be displayed through a browser or other types of software. The contents might be in Hypertext Markup Language ("HTML"), JavaScript, or other similar known formats. In addition, the client device 2 may contain known operating systems such as Android, iOS, or Microsoft Windows.

Preferably, the client device 2 has a web browser 3 residing therein if the client device 2 is a computer, or a mobile application if the client device 2 is, for example, a smartphone or a tablet.

For brevity, reference will be only made hereinbelow to the exemplary case of the web browser 3 residing in the client device 2.

The method further comprises the step of providing a Traffic Analyzer 5 in signal communication with the Traffic Inspector 1.

As used herein, a Traffic Inspector 1 refers to a device in line with the web traffic between each client device 2 and the web server 4 in which the online service resides. Thus, the Traffic Inspector 1 is able to intercept the following communication-related information: Internet Protocol ("IP") address of a Hypertext Transfer Protocol ("HTTP") request, cookies, the headers, and the body of the same HTTP request. The Traffic Inspector 1 is preferably a hardware device, in which software components reside, and configured to generate a unique code and to introduce it into a cookie within the response to the HTTP request. More preferably, the Traffic Inspector 1 is configured to modify the Document Object Model ("DOM") code of a web page by adding the code required to generate and send a fingerprint. In addition, the Traffic Inspector 1 is configured to send to the Traffic Analyzer 5 all the information collected during each user's browsing sessions on the online service residing in the web server 4.

As used herein, a Traffic Analyzer 5 refers to a hardware device having software components, such as algorithms 7, 8, 9, 10, residing therein to: extract the username of the information received from the Traffic Inspector 1 (extraction algorithm 10); associate the username with the unique information of the HTTP request from which it was extracted, such as IP and Universally Unique Identifier ("UUID") in a cookie; estimate the username that generated the HTTP request in the event that this request does not contain actual credentials, the estimate being based on the unique information within the HTTP request associated with the estimated username(s) (user prediction algorithm 7); identify an Account Take Over attack (detection algorithm 8); and/or protect the user in the event of an attack (protection algorithm 9). Furthermore, the Traffic Analyzer 5 preferably comprises a database 6 for storing such associations A between the username and unique information such as, for example, IP and UUID.

It should be noted that, according to a preferred arrangement of the invention, the Traffic Inspector 1 and the Traffic Analyzer 5 may be implemented in a single machine (or electronic device) which is therefore able to carry out the tasks of the Traffic Inspector 1 and the Traffic Analyzer 5 in the same manner as described herein.

The method comprises the step of identifying each browsing session of the client device 2 and preferably of the web browser 3 on the online service by the Traffic Inspector 1.

The method also comprises the step of analyzing the traffic exchanged between the client device 2 and the web server 4, and preferably between web browser 3 and the web server 4, by the Traffic Analyzer 5 to extract and identify at least one username when a user performs authentication to the online service.

In other words, the architecture based on a Traffic Inspector 1 and a Traffic Analyzer 5 affords monitoring of web/mobile application traffic.

Furthermore, the method comprises the step of collecting, by the Traffic Inspector 1, first characteristic data concerning unique and/or non-unique technical parameters and associating, by the Traffic Analyzer 5, the first characteristic data with a respective identified username.

The method comprises the step of storing the first characteristic data associated with each identified username in a database 6 associated with the Traffic Analyzer 5.

The method also comprises the step of identifying by the Traffic Analyzer 5 each anonymous application browsing session of the client device 2 on the online service, preferably of the web browser 3, and each anonymous web beacon generated in a respective virtual anonymous session of the client device 2 on the online service. The anonymous web beacon is indicative of the fact that client device 2 has started a fraudulent browsing session on a phishing web server 11.

As used herein, a "web beacon" refers to an element included in a web page to monitor how the page is actually displayed by a user. For example, a web beacon might be an image or other type of static resource referenced by the web page. When the user obtains the web page from the web server 4 through a request, the beacons are not sent directly. When the page is displayed within the user's client device 2, for example, through a web browser 3, the beacons referenced within the web page are requested from the web server 4. Therefore, it will be possible to determine whether the online service page was actually displayed on the client device 2 by checking whether the requests for the beacons were sent from the log with the requests to the web server 4. A web beacon may be a resource that is already present on the page (for example, a logo or other graphics). Otherwise, it could be an image, for example, an image consisting of a single transparent pixel specifically inserted for monitoring purposes. These resources include a unique name reference within the web page.

The method also comprises the step of collecting, by the Traffic Inspector 1, second characteristic data concerning unique and/or non-unique technical parameters, and associating, by the Traffic Analyzer 5, the second characteristic data with the anonymous application browsing session or with the anonymous web beacon identified in the previous step.

The method further comprises the step of comparing by means of a user prediction algorithm 7 residing in the Traffic Analyzer 5, the first characteristic data with the second characteristic data to associate an identified username with the anonymous application browsing session or with the anonymous web beacon in case of similarity or substantial coincidence between the first characteristic data and the second characteristic data so compared. In other words, the method includes associating a number of possible users with the anonymous application browsing session or with the anonymous web beacon through a user prediction algorithm 7, which analyzes the set of technical parameters collected about the session and compares them to the history of the parameters and authenticated sessions that were previously collected, analyzed, or monitored. Therefore, a prediction is made at this stage about the identity of the user (or users) behind the anonymous session, which is about to perform authentication.

The method comprises the step of taking security measures on the anonymous application browsing session or the anonymous virtual session of the client device 2 when the number of identified usernames associated with the anonymous application browsing session or the anonymous web beacon in the previous step exceeds a predetermined threshold value. In other words, if the number of estimated users, that might be hidden behind the anonymous application browsing session or virtual anonymous session of the client device 2 exceeds a certain preset number, the method recognizes a risk of Account Take Over. Thus, the client device 2 might be the device of a fraudster F who performed a number of logins in the past by authenticating with the credentials of many users from whom they had illicitly stolen the credentials for access to the online service.

According to a preferred embodiment of the invention, the step of taking security measures on the anonymous application browsing session or the anonymous virtual session of the client device 2 when the number of identified usernames associated with the anonymous application browsing session or the anonymous web beacon in the previous step exceeds a predetermined threshold value includes taking one or more of the following security measures:
- preventively blocking the actions of the users corresponding to the identified usernames associated with the anonymous application browsing session or with the anonymous web beacon;
- preventively blocking the anonymous application browsing session or the anonymous web beacon;
- preventively blocking subsequent sessions from the client device 2 and/or blocking operations from the client device 2;
- automatically requesting additional information to check the legitimacy of operations from the client device 2, for example, by step up authentication, Strong Customer Authentication ("SCA"), etc.; and/or
- generating a warning P by the Traffic Analyzer 5 directed to the user or other users, for example to trigger a manual review operation.

According to a preferred embodiment, the step of taking security measures on the anonymous application browsing session or the anonymous virtual session of the client device 2 when the number of identified usernames associated with the anonymous application browsing session or the anonymous web beacon in the previous step exceeds a predetermined threshold value includes taking one of the following security measures:
- requesting higher level authentication when the number of identified usernames associated with the anonymous application browsing session or the anonymous web beacon ranges from 1 to 5;
- blocking the browsing session when the number of identified usernames associated with the anonymous application browsing session or with the anonymous web beacon is greater than 5.

In other words, when the number of users expected for the anonymous session or web beacon, and thus previously authenticated by client device 2, ranges from 1 to 5, it is a suspicious number of users, with a moderate risk of Account Take Over. Therefore, the method includes enforcing enhanced authentication, such as additional authentication via Short Message Service ("SMS") and/or monitoring economic transactions in case of online banking, without directly proceeding to blocking actions. On the other hand, if the number of users previously authenticated by client device 2 is greater than 5, then there is a real risk of fraud due to Account Take Over. Here, the method involves blocking measures, such as those blocking operations and transactions.

In a preferred arrangement, the method comprises the additional step of identifying, by means of a detection algorithm 8 residing in the Traffic Analyzer 5, each subsequent browsing session of the client device 2 authenticated to the online service and classifying it as a browsing session at risk when the username of the authenticated user in that subsequent session does not match the at least one identified username associated with the anonymous application browsing session or the anonymous web beacon.

Preferably, the method comprises the step of protecting each classified browsing session at risk using the protection algorithm 9 residing in the Traffic Analyzer 5.

According to a preferred embodiment, the step of identifying by means of the detection algorithm 8 residing in the Traffic Analyzer 5 each subsequent browsing session authenticated to the online service, comprises the substeps of:
- generating, by means of the detection algorithm 8, the time frequencies of accesses and attempted accesses to the online service by an identified username from the client device 2; and
- applying user behavior and anomaly detection algorithms to identify a risk of Account Take Over when an anomaly is detected in the generated time frequencies.

According to a preferred arrangement, the step of applying user behavior and anomaly detection algorithms to identify a risk of Account Take Over when an anomaly in the generated time frequencies is detected, comprises the substep of detecting an anomaly when the time at which user authentication takes place and the time at which a subsequent authentication of a different user takes place by the same client device 2 are close together. This advantageously affords identification of multiple logins by the fraudster F on its client device 2, with the credentials fraudulently stolen from the legitimate users.

Preferably, the step of protecting each browsing session at risk comprises the sub-step of taking measures that block the browsing session at risk using the protection algorithm 9.

Still preferably, the step of protecting the browsing session at risk using the protection algorithm 9 comprises the substep of locking the username of the user associated with the browsing session at risk, executing a Strong Customer Authentication ("SCA") algorithm for the username of the user associated with the browsing session at risk, or executing a Multi-Factor Authentication ("MFA") algorithm for the username of the user associated with the browsing session at risk.

According to a preferred embodiment, the method comprises the step of generating the warning P indicative of a possible threat associated with a malware attack or a phishing attack when a browsing session at risk is classified.

Preferably, the step of collecting, by the Traffic Inspector 1, first characteristic data concerning unique and/or non-unique technical parameters and associating, by the Traffic Analyzer 5, the first characteristic data with a respective identified username comprises the substep of collecting, through the Traffic Inspector 1, first characteristic data concerning one or more of unique technical parameters, non-unique technical parameters, endpoints (e.g., fingerprints), networks (e.g., IP), and browsers (e.g., tracking and mark-up cookies). In other words, in this step the method combines the identified username and all unique and non-unique technical parameters with the authenticated browsing session.

Still preferably, the step of collecting, by the Traffic Inspector 1, second characteristic data concerning unique and/or non-unique technical parameters, and associating, by the Traffic Analyzer 5, the second characteristic data with the anonymous application browsing session or with the anonymous web beacon identified comprises the sub-step of: collecting, by the Traffic Inspector 1, second characteristic data concerning one or more of unique technical parameters, non-unique technical parameters, endpoints (e.g., fingerprints), networks (e.g., IP), and browsers (e.g., tracking and mark-up cookies).

Still preferably, the first characteristic data and the second characteristic data include UUID and IP. It should be noted that in FIG. 2 the second characteristic data is indicated by IP1 and UUID1.

Preferably, the step of identifying each browsing session of the client device 2 on the online service by the Traffic Inspector 1 comprises the substep of identifying each browsing session of the client device 2 on the online service by the Traffic Inspector 1 using session cookies.

Still preferably, the step of identifying each anonymous web beacon generated by client device 2 on the online service by the Traffic Analyzer 5 comprises the substep of identifying each anonymous web beacon generated by client device 2 on the online service by the Traffic Analyzer 5 using session cookies.

Preferably, the step of identifying each browsing session of the client device 2 on the online service, by the Traffic Inspector 1, comprises the substep of intercepting, by the Traffic Inspector 1, an HTTP request sent by a web browser 3 residing in the client device 2 to the web server 4.

Still preferably, the step of analyzing the traffic exchanged between the client device 2 and the web server 4 through the Traffic Analyzer 5 to extract and identify at least one username when a user performs authentication to the online service, comprises the substep of extracting a username from the HTTP request intercepted by the Traffic Inspector 1 when a user performs authentication to the online service using an extraction algorithm 10 residing in the Traffic Analyzer 5 and based on regular expressions.

Referring to the embodiment in which the Traffic Inspector 1 is configured to modify the DOM code of a web page by adding the code required to generate and send a fingerprint, the code required to generate a fingerprint preferably contains the instructions required to capture certain information that characterizes an execution environment of the above code, such as the web browser 3 or a mobile client device 2. More preferably, the code contains instructions aimed at converting the collected information (i.e., the first and second characteristic data), into a compact format. The device that executes these instructions contains instructions for sending the collected information to the Traffic Analyzer 5. Still preferably, the instructions aimed at converting the collected information into a compact format are executed both in the web browser 3 and in the Traffic Inspector 1. When the instructions aimed at transforming the collected information into a compact format are executed within the web browser 3, the code only sends the compact representation of the collected information to the Traffic Analyzer 5. Preferably, the collected information relates to the list of typographical sources installed inside the device. More preferably, the collected information includes the screen size of the device. While this information is not unique, it is distributed with sufficient rarity to allow identification of a client device 2 based on it. On some devices, the characteristic information may be information that is only available in certain types of devices. For example, some mobile devices offer native serial numbers. Advantageously, this information offers even higher guarantees as to the uniqueness of the collected information. In addition, the code may capture more information than those mentioned above. The Traffic Analyzer 5 stores such information on a permanent database 6 with information relating to the user associated with the client device 2, as soon as it is available. When the Traffic Analyzer 5 receives the fingerprint information of a client device 2, it searches the permanent database 6 for information about the user profile that has previously been associated with such fingerprint information. Thus, with fingerprint information, the user profile of a device can be assumed even when the latter did not authenticate with its credentials, much like UUID and IP.

Advantageously, the method of the present invention can identify possible risks associated with multiple logins to the online service by a fraudster F, as a result of an Account Take Over attack.

Still advantageously, the method of the present invention can provide a prediction of the identity of the user acting in an area that is still anonymous, because it has not been authenticated yet, by using the user prediction algorithm 7 to generate a list of potential users that might hide behind the anonymous browsing session. If the number of users in that list exceeds a preset threshold, then a risk of Account Take Over is identified as the client device 2 is assumed to be used by a fraudster F that logs in multiple times to the online service using credentials fraudulently stolen from legitimate users.

Advantageously, the method of the present invention can identify and counteract any Account Take Over attack against users registered with an online service.

Advantageously, the method of the present invention can identify specific attack scenarios such as phishing, brute force attacks, and multiple Account Take Over ("ATO") by a fraudster F.

Figure 3:
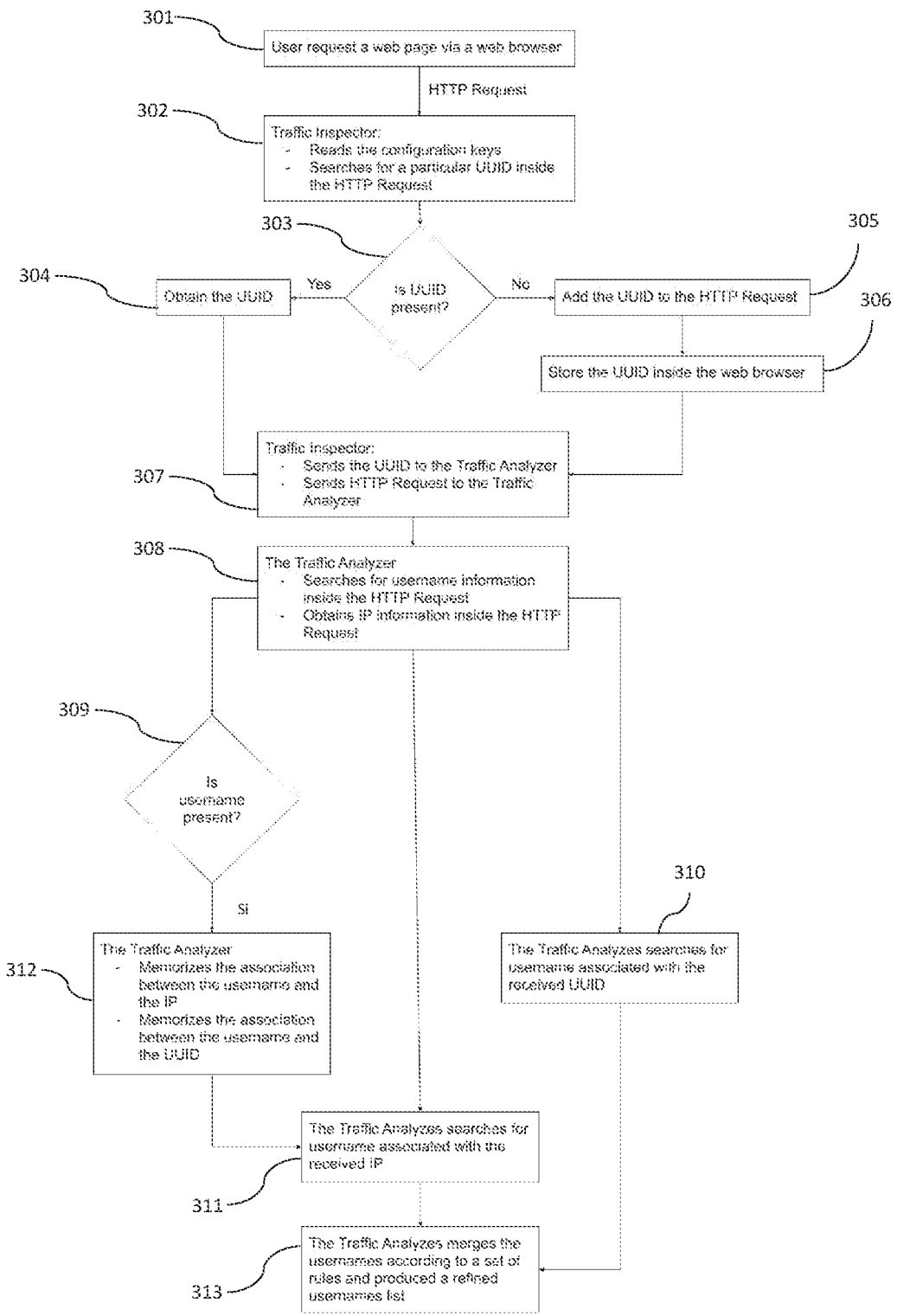
FIG. 3 shows a flow chart of one embodiment of the method of the invention.

One example of application of the method of the present invention is described hereinafter, with particular reference to the sequence of steps as shown in FIG. 3.

Particularly referring to FIG. 3, the step of identifying each browsing session of the web browser 3 on the online service by the Traffic Inspector 1 includes:
  the substep 301 in which the user requests a web page via a web browser 3 that sends a HTTP request to the web server 4.

The step of analyzing the traffic exchanged between the web browser 3 and the web server 4 by the Traffic Analyzer 5 to extract and identify at least one username when a user performs authentication to the online service includes:
  the substep 302 in which the Traffic Inspector 1 reads the configuration keys and searches for a particular UUID in the HTTP request;
  the substep 303 of determining whether there is a UUID in the HTTP request;
  the sub-step 304 of obtaining the UUID if any;
  the substep 305 of adding a UUID to the HTTP request if there is none, and the substep 306 of holding the UUID in the web browser 3;
  the substep 307 in which the Traffic Inspector 1 sends the UUID in the HTTP request to the Traffic Analyzer 5; and
  the substep 308 in which the Traffic Analyzer 5 searches for username information in the HTTP request and obtains IP information from the HTTP request.

The step of collecting, by the Traffic Inspector 1, first characteristic data concerning unique and/or non-unique technical parameters and associating, by the Traffic Analyzer 5, the first characteristic data with a respective identified username, includes:
- the substep 309 of checking whether there is a username in the HTTP request;
- the substep 310 in which the Traffic Analyzer 5 searches for usernames already associated with received UUID; and
- the substep 311 in which the Traffic Analyzer 5 searches the database 6 for usernames already associated with the received IP.

The step of storing the first characteristic data associated with each identified username in a database 6 associated with the Traffic Analyzer 5 includes:
- if the username is present in the HTTP request, the substep 312 in which the Traffic Analyzer 5 stores the associations A detected between the username and the IP, and stores the associations A detected between the username and the UUID in the database 6; and
- the substep 313 in which the Traffic Analyzer 5 combines the usernames according to preset rules and produces a refined list of usernames.

The invention claimed is:

1. A method of monitoring and protecting access to an online service from Account Take Over, the method comprising:
   providing a Traffic Inspector in signal communication with at least one client device for Internet browsing and with a web server having the online service residing therein;
   providing a Traffic Analyzer in signal communication with the Traffic Inspector;
   identifying, by the Traffic Inspector, each browsing session of the at least one client device on the online service;
   extracting and identifying, by the Traffic Analyzer, one or more usernames when a user performs authentication to the online service by analyzing traffic exchanged between the at least one client device and the web server;
   collecting, by the Traffic Inspector, first characteristic data concerning unique technical parameters, non-unique technical parameters, or unique and non-unique technical parameters and associating, by the Traffic Analyzer, the first characteristic data with respective identified one or more usernames and with the at least one client device;
   storing the first characteristic data in a database associated with the Traffic Analyzer;
   identifying, by the Traffic Analyzer, each anonymous application browsing session of the at least one client device on the online service and each anonymous web beacon generated in a respective anonymous virtual session of the at least one client device on the online service, wherein the anonymous web beacon indicates that the at least one client device has started a fraudulent browsing session on a phishing web server;
   collecting, by the Traffic Inspector, second characteristic data concerning unique technical parameters, non-unique technical parameters, or unique and non-unique technical parameters and associating, by the Traffic Analyzer, the second characteristic data with the anonymous application browsing session or with the anonymous web beacon identified by the Traffic Analyzer;
   associating an identified username with the anonymous application browsing session or with the anonymous web beacon when similarity or substantial coincidence occurs between the first characteristic data and the second characteristic data, compared using a user prediction algorithm residing in the Traffic Analyzer; and
   taking security measures on the anonymous application browsing session or on the anonymous virtual session of the at least one client device when a number of identified usernames associated with the anonymous application browsing session or with the anonymous web beacon exceeds a predetermined threshold value.

2. The method of claim 1, wherein the taking of the security measures on the anonymous application browsing session or on the anonymous virtual session of the at least one client device, when the number of identified usernames associated with the anonymous application browsing session or the anonymous web beacon exceeds the predetermined threshold value, includes taking one or more of the following security measures:
   preventively blocking actions of users corresponding to the identified usernames associated with the anonymous application browsing session or with the anonymous web beacon;
   preventively blocking the anonymous application browsing session or the anonymous web beacon;
   preventively blocking subsequent sessions from the at least one client device, blocking operations from the at least one client device, or preventively blocking subsequent sessions from the at least one client device and blocking operations from the at least one client device;
   automatically requesting additional information to check legitimacy of operations from the at least one client device; and
   generating a warning.

3. The method of claim 1, wherein the taking of the security measures on the anonymous application browsing session or on the anonymous virtual session of the at least one client device when the number of the identified usernames associated with the anonymous application browsing session or the anonymous web beacon exceeds the predetermined threshold value includes;
   requesting higher level authentication when the number of the identified usernames associated with the anonymous application browsing session or the anonymous web beacon is greater than or equal to 1 and is less than or equal to 5; and
   blocking an associated browsing session when the number of the identified usernames associated with the anonymous application browsing session or with the anonymous web beacon is greater than 5.

4. The method of claim 1, further comprising:
   identifying, using a detection algorithm residing in the Traffic Analyzer, each subsequent browsing session of the at least one client device authenticated to the online service and classifying it as a browsing session at risk when a username of the authenticated user in that subsequent session does not match the one or more identified usernames associated with the anonymous application browsing session or the anonymous web beacon; and
   protecting each classified browsing session at risk using a protection algorithm residing in the Traffic Analyzer.

5. The method of claim 4, wherein the identifying, using the detection algorithm residing in the Traffic Analyzer, of each subsequent browsing session authenticated to the online service comprises:

generating, using the detection algorithm, time frequencies of accesses and attempted accesses to the online service by an identified username from the at least one client device; and applying user behavior and anomaly detection algorithms to identify a risk of Account Take Over when an anomaly is detected in the generated time frequencies.

6. The method of claim 5, wherein the applying of the user behavior and anomaly detection algorithms to identify the risk of Account Take Over when the anomaly is detected in the generated time frequencies comprises:

detecting an anomaly when a time at which a user is authenticated and a time at which a different user is subsequently authenticated using a same client device are close together.

7. The method of claim 4, wherein the protecting of each classified browsing session at risk comprises:

taking measures that block the classified browsing session at risk using the protection algorithm.

8. The method of claim 4, wherein the protecting of the browsing session at risk using the protection algorithm comprises:

locking the username of the user associated with the browsing session at risk, executing a Strong Customer Authentication (SCA) algorithm for the username of the user associated with the browsing session at risk, or executing a Multi-Factor Authentication (MFA) algorithm for the username of the user associated with the browsing session at risk.

9. The method of claim 4, further comprising:

generating a warning indicative of a possible threat associated with a malware attack or a phishing attack when the browsing session at risk is classified.

10. The method of claim 1, wherein the collecting, by the Traffic Inspector, of the first characteristic data concerning unique technical parameters, non-unique technical parameters, or unique and non-unique technical parameters and the associating, by the Traffic Analyzer, of the first characteristic data with a respective identified username, comprises:

collecting, by the Traffic Inspector, of the first characteristic data concerning one or more of unique technical parameters, non-unique technical parameters, endpoints, networks, and browsers; and wherein the collecting, by the Traffic Inspector, of the second characteristic data concerning unique technical parameters, non-unique technical parameters, or unique and non-unique technical parameters and the associating, by the Traffic Analyzer, of the second characteristic data with the anonymous application browsing session or with the anonymous web beacon identified, comprises:

collecting, by the Traffic Inspector, of the second characteristic data concerning one or more of unique technical parameters, non-unique technical parameters, endpoints, networks, and browsers.

11. The method of claim 10, wherein the first characteristic data and the second characteristic data comprise a Universally Unique Identifier (UUID) and Internet Protocol (IP) address.

12. The method of claim 1, wherein the identifying, by the Traffic Inspector, of each browsing session of the at least one client device on the online service comprises:

identifying, by the Traffic Inspector, each browsing session of the at least one client device on the online service using session cookies; and wherein the identifying, by the Traffic Analyzer, of each generated anonymous web beacon of the at least one client device on the online service comprises:

identifying, by the Traffic Analyzer, each anonymous web beacon generated by the at least one client device on the online service using session cookies.

13. The method of claim 1, wherein the identifying, by the Traffic Inspector, of each browsing session of the at least one client device on the online service comprises:

intercepting, by the Traffic Inspector, of a Hypertext Transfer Protocol (HTTP) request sent by a web browser residing in the at least one client device to the web server; and wherein the extracting and identifying at least one username when the user performs authentication to the online service comprises:

extracting a username from the HTTP request intercepted by the Traffic Inspector when the user performs authentication to the online service using an extraction algorithm residing in the Traffic Analyzer and based on regular expressions.

14. The method of claim 1, wherein the similarity or substantial coincidence occurs between the first characteristic data and the second characteristic data when at least one of the unique technical parameters, non-unique technical parameters, or unique and non-unique technical parameters of the first characteristic data is identical to at least one of the unique technical parameters, non-unique technical parameters, or unique and non-unique technical parameters of the second characteristic data.

15. The method of claim 1, wherein the similarity or substantial coincidence occurs between the first characteristic data and the second characteristic data when at least one of the unique technical parameters of the first characteristic data is identical to at least one of the unique technical parameters of the second characteristic data.

16. The method of claim 1, wherein the similarity or substantial coincidence occurs between the first characteristic data and the second characteristic data when at least one of the non-unique technical parameters of the first characteristic data is identical to at least one of the non-unique technical parameters of the second characteristic data.

17. The method of claim 1, wherein the similarity or substantial coincidence occurs between the first characteristic data and the second characteristic data when at least one of the unique and non-unique technical parameters of the first characteristic data is identical to at least one of the unique and non-unique technical parameters of the second characteristic data.

18. A method of monitoring and protecting access to an online service from Account Take Over, the method comprising:

providing a Traffic Inspector in signal communication with at least one client device for Internet browsing and with a web server having the online service residing therein;

providing a Traffic Analyzer in signal communication with the Traffic Inspector;

identifying, by the Traffic Inspector, each browsing session of the at least one client device on the online service;

extracting and identifying, by the Traffic Analyzer, one or more usernames when a user performs authentication to the online service by analyzing traffic exchanged between the at least one client device and the web server;

collecting, by the Traffic Inspector, first characteristic data concerning unique technical parameters, non-unique technical parameters, or unique and non-unique technical parameters and associating, by the Traffic Analyzer, the first characteristic data with respective identified one or more usernames and with the at least one client device;

storing the first characteristic data in a database associated with the Traffic Analyzer;

identifying, by the Traffic Analyzer, each anonymous application browsing session of the at least one client device on the online service and each anonymous web beacon generated in a respective anonymous virtual session of the at least one client device on the online service, wherein the anonymous web beacon indicates that the at least one client device has started a fraudulent browsing session on a phishing web server;

collecting, by the Traffic Inspector, second characteristic data concerning unique technical parameters, non-unique technical parameters, or unique and non-unique technical parameters and associating, by the Traffic Analyzer, the second characteristic data with the anonymous application browsing session or with the anonymous web beacon identified by the Traffic Analyzer;

associating an identified username with the anonymous application browsing session or with the anonymous web beacon when the first characteristic data and the second characteristic data, compared using a user prediction algorithm residing in the Traffic Analyzer, are at least in part identical or coincident; and taking security measures on the anonymous application browsing session or on the anonymous virtual session of the at least one client device when a number of identified usernames associated with the anonymous application browsing session or with the anonymous web beacon exceeds a predetermined threshold value.

19. The method of claim 18, wherein the first characteristic data and the second characteristic data, compared using the user prediction algorithm residing in the Traffic Analyzer, are at least in part identical.

20. The method of claim 18, wherein the first characteristic data and the second characteristic data, compared using the user prediction algorithm residing in the Traffic Analyzer, are at least in part coincident.

* * * * *